(No Model.) 2 Sheets—Sheet 1.
O. B. FAHNEHJELM & C. DELLWIK.
MACHINE FOR MANUFACTURING LAMELLÆ OR NEEDLES FOR INCANDESCENT GAS BURNERS.
No. 485,322. Patented Nov. 1, 1892.
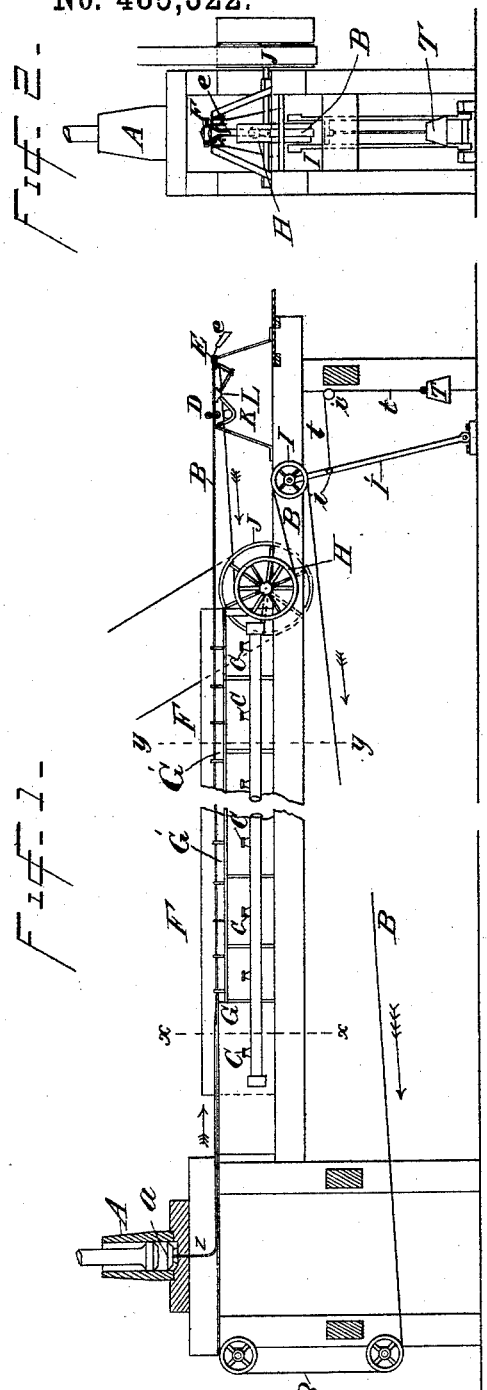
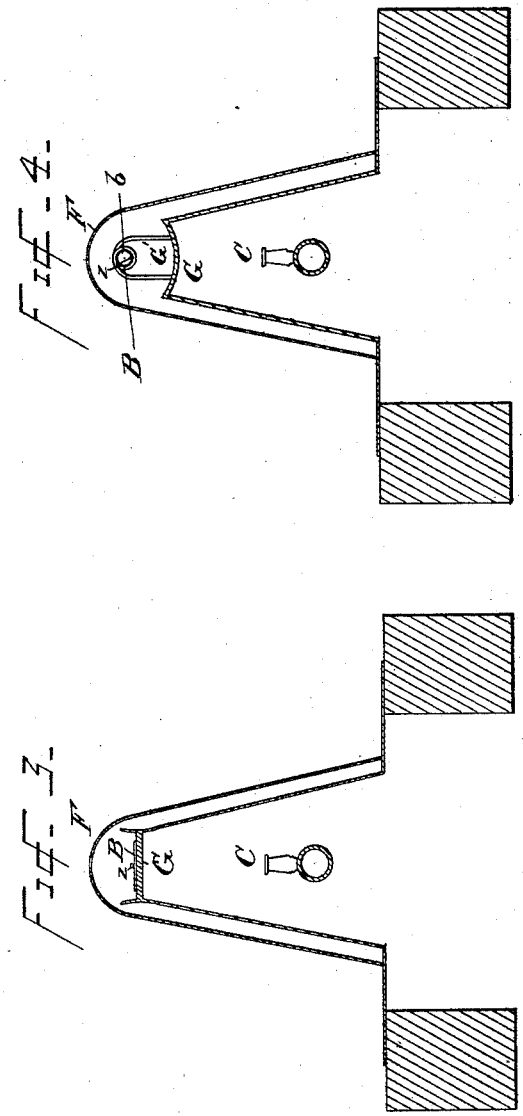
Attest
Arthur A. Erb.
E. B. Sterling
Inventors.
Otto B. Fahnehjelm
Carl Dellwik
By E. A. Clark
Atty.

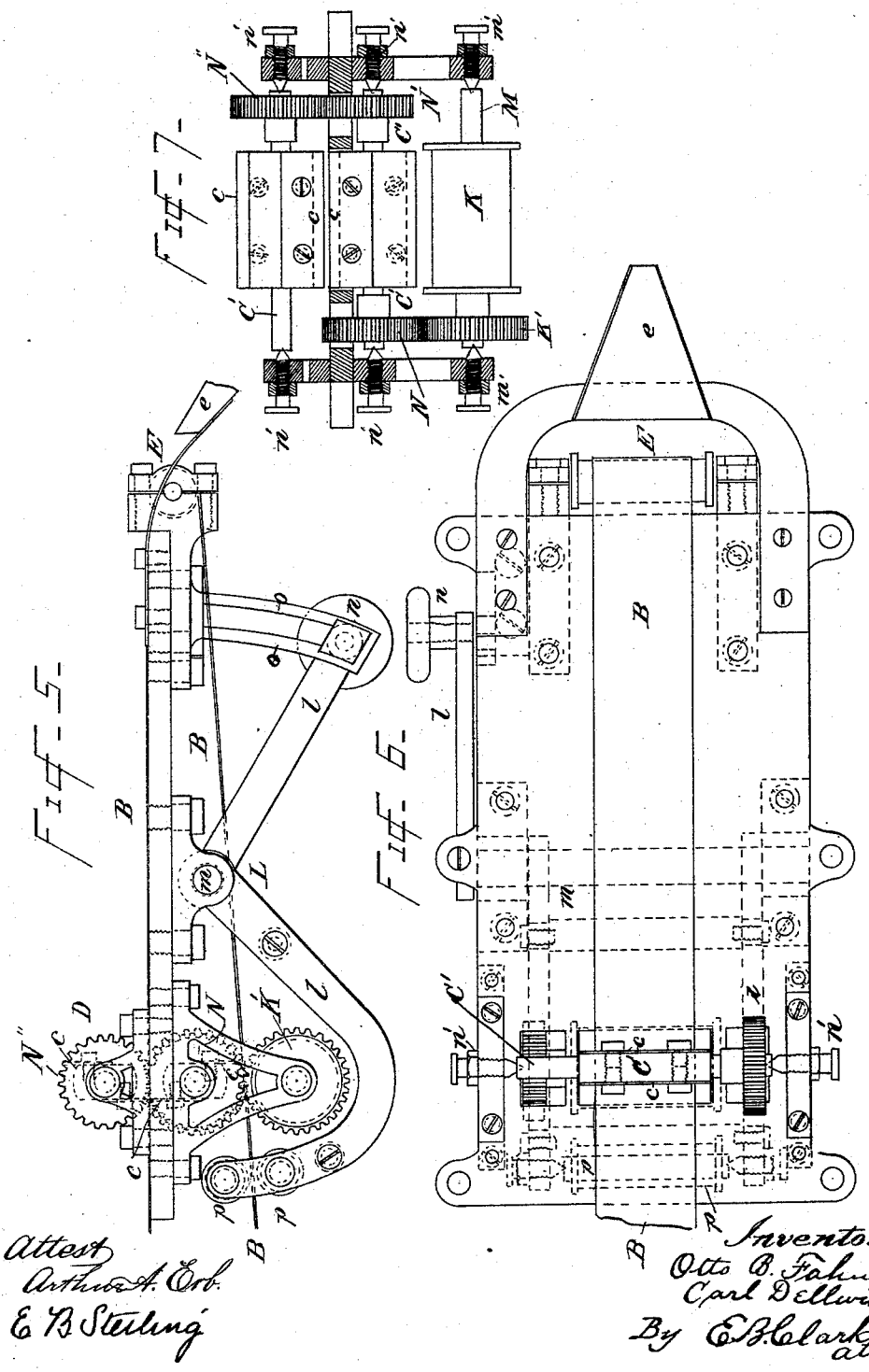

UNITED STATES PATENT OFFICE.

OTTO B. FAHNEHJELM, OF STOCKHOLM, SWEDEN, AND CARL DELLWIK, OF ROGERS PARK, ILLINOIS.

MACHINE FOR MANUFACTURING LAMELLÆ OR NEEDLES FOR INCANDESCENT GAS-BURNERS.

SPECIFICATION forming part of Letters Patent No. 485,322, dated November 1, 1892.

Application filed June 21, 1890. Serial No. 356,313. (No model.)

*To all whom it may concern:*

Be it known that we, OTTO B. FAHNEHJELM, of Stockholm, Sweden, and CARL DELLWIK, of Rogers Park, Cook county, State of Illinois, have invented a new and useful Improvement in Machines for Manufacturing Lamellæ or Needles for Incandescent Gas-Burners, of which the following is a true and exact description, reference being had to the accompanying drawings, which form a part of this specification.

Our invention relates to the apparatus by which a plastic or liquid mass may be readily and economically converted into forms, shapes, or special designs, and when so converted can be so hardened and cut that they may be conveniently handled, and so that the shapes given to them may be easily preserved. To accomplish this result, we arrange in consecutive order and upon a suitable framework or bed a press with suitable molds for forming the plastic or liquid material, a carrier to transmit it, suitable heating apparatus for hardening it, a proper cutting device for dividing it, and an automatic assorter or separator for selecting and preserving the perfect and rejecting the imperfect forms. We also bring about a more accurate adjustment of the cutters and carriers by means of suitable devices to properly regulate their speed and action.

In the annexed drawings, Figure 1 is a side elevation of the apparatus as a whole, but broken in the middle to indicate that it may be constructed of different lengths to correspond to the duty required. Fig. 2 is an end view as seen from the right-hand end of Fig. 1. Fig. 3 is a cross-section at the line $x\ x$; and Fig. 4, a similar view at the line $y\ y$, showing the curved guides $b$. Fig. 5 shows a side elevation of the cutting device and the appliances adjacent. Fig. 6 is a plan of the same, and Fig. 7 a sectional view of the cutters with their bearings and special gear.

In all the figures similar letters represent corresponding parts.

A is a suitable press for containing and expelling the plastic or liquid mass through the die or mold $a$ to give the material so expelled the proper shape.

B represents a tape, chain, or other endless carrier-belt upon which the plastic material $z$ is deposited and upon which it is carried in the direction indicated by the arrows. C C represents a series of gas-burners arranged longitudinally under the said carrier.

D represents the cutting device for dividing the material into proper lengths.

E is a space between the carrier and the guide-trough $e$, forming our assorter, through which the short, broken, or imperfect pieces of the material fall in passing, so as to drop out of the course of treatment.

F is a cover or hood reaching over and inclosing the carrier.

G G represents a series of metal flame-deflectors to prevent the flame from striking the carrier, and also to equalize the temperature.

H is the driving-pulley for propelling the carrier-belt B.

J is the main driving or power pulley-carrying the power-belt and fixed on the same shaft as belt-pulley H.

I is a swinging, loose, and yielding pulley attached by a lever and a rope or chain to the weight T.

K is a spool or roller having a gear-wheel K' for operating the cutter D, and L is a bent or crank lever having at one end the guide rollers or spools $p\ p$ for throwing the carrier-belt B into or out of contact with the spool or roller K, and thereby putting into or out of motion the gear-wheels which operate the cutter D.

The complete description and method of operation of our apparatus is as follows: We employ any suitable press or apparatus A, by which the plastic or liquid material $z$ can be retained, and into the bottom or side of which a proper hole, slit, form, or mold $a$ can be set or cut. By putting the press into operation the plastic or liquid material is expelled in the proper form of wires, ribbons, lamellæ, films, needles, or other shapes, and the material so formed falls regularly upon the carrier B. The carrier B must be propelled by a regular motion, and its speed should be so regulated that the material $z$ will not be stretched by its rapidity or made lumpy or distorted by its slowness. The carrier bearing the material $z$ passes over and upon the warm or hot flame-deflectors G G, which are heated from beneath by means of the gas-burners C C or other suitable heating devices for a sufficient distance to properly harden or solidify said material. We prefer to confine the heat more directly upon the material by means of the hoods or covers F, which equalize and heighten the effect of the heat and save a large part of the waste thereof. As the material passes along and in order to prevent any undesirable corrugation, wrinkling, or twisting of the said material, we sometimes pass the carrier through circular or curved guides b, as shown at Fig. 4, so as to correct any such malformations. This we do at the proper place and before the material has become too hard. We prefer, however, to discontinue the circular or curved guides at such a distance before the cutters are reached that the carrier-belt may have resumed its flat or level position at the cutters, although this might be easily avoided by changing the form of the cutters, hereinafter described. When the material is properly hardened and is ready to be divided, we subject it to the action of such a device as will sever it into equal or proper lengths without fracturing it at improper places or disturbing its regular shape. To accomplish this, we prefer to use a double cutter, as shown in the views, on enlarged scale, in Figs. 5, 6, and 7. The cutter D is composed of two shafts C' C', mounted in suitable bearings, one above the other, and provided on opposite sides with the cutter-blades c c, as clearly shown in Fig. 7. The shafts C' C' are preferably mounted upon the four pointed pivots n', and the lower shaft is provided at one end with a gear-wheel N, which meshes with the gear-wheel K', and at the other end with a gear-wheel N', which meshes with the gear-wheel N'', fixed upon the upper shaft. The spool or roller K, to which motion is imparted by the carrier-belt, is fixed upon the shaft M, which is mounted on the pivotal bearings m', and to said shaft M is secured the gear-wheel K', which meshes with the gear-wheel N of the cutter, as above described. By means of the carrier-belt B, passing in contact with the spool or roller K, such a regular and uniform motion is imparted to the gear-wheels of the cutter as to bring the cutting-blades c c on the upper and lower shafts opposite to each other at regular intervals and at the precise time when the proper length of plastic material has passed through the spaces between said cutter-blades during the period of their equal revolution.

It will be readily seen that the size of the spool or roller K, gear K', and the gears connected therewith on the cutter-shafts must be so proportioned to each other as to permit the lapse of the correct length of time between each revolution of the knives or cutters, and also so that the speed of the knives or cutters shall be no slower than that of the carrier. It will also be observed that there may be times at which the cutting devices are not necessarily employed and the machine may be made useful without them, or it may be important to disconnect them to prevent unnecessary wear upon the bearings. To effect this, we have arranged the belt-shifting device L, (shown at Figs. 1 and 5,) which is so arranged in connection with the carrier-belt B that it may raise or lower it, as desired. This shifting device consists of a bent lever of the first class l, secured upon the rock-shaft m and terminating at one end in a thumb-screw or equivalent device n, which slides in a segmental guide o o, so that the lever l may be made permanent in any desired position. At the opposite end of the bent lever l are set two small guide rollers or spools p p, between which the carrier B passes. It will be observed that when the cutters D are unemployed the carrier-belt B may be shifted to pass without coming in contact with the spool or roller K. At such times the lever l would remain in the position shown in Fig. 5; but if the cutters are desired to act the thumb-screw n may be loosened and raised in the segmental guide o o until the carrier-belt is thrown in sufficient contact with the spool or roller K by the lowering of the small guide-roller p p.

The carrier-belt B must at all times be kept at substantially the same regular tension and so tight as not to slip or lose its speed and so loose as to cause no unnecessary strain upon the parts of the machine or upon itself. To regulate this, we have arranged a yielding weighted tension device consisting of a loose pulley I, supported by a proper hinged bar I', to which is attached at i near the pulley I a cord t, running over a fixed pulley i' and supporting a proper weight or weights T. By increasing or diminishing the amount of the weight so supported the tension of the carrier is also increased or diminished, as desired. The carrier-belt B after passing spool K passes back around the driving-pulley H, thence forward over the yielding-tension pulley I, and finally back over guide-pulleys at the front end of the machine.

Having now described our invention, what we claim as new, and desire to secure by Letters Patent, is—

1. The combination of the press A, the carrier-belt B, the gas-burners C C, and a flame-deflector, substantially as described.

2. The combination of the carrier-belt B, the gas-burners C C, the cutter D, and means for delivering to said belt a strip or lamellæ of plastic material to be cut into short lengths, substantially as described.

3. The combination of the carrier-belt B, the cutter D, and a delivery-spout e, set a short distance beyond the carrier-belt at the end of the machine and leaving a space E to act as an assorter, substantially as described.

4. In combination with press A and cutter D, the carrier-belt B, driving-pulley H, and the yielding-tension pulley I, said belt passing over said pulleys and the parts being so adjusted with reference to each other that the combination shall expel, receive, and transmit the material $z$ so as not to stretch or wrinkle the same, substantially as described.

5. The cutter D, consisting of upper and lower revolving shafts C C, carrying the knives $c\ c$, the spool or roller K, and operating-gears connecting the same, in combination with a carrier-belt passing in contact with roller K and the cutter, substantially as described.

6. In combination with the cutter D, having revolving shafts, a spool K and operating-gears, the carrier-belt between the cutter-shafts and spool K, and the belt-shifting lever $l$, having spools or rollers $p\ p$ for bearing upon the belt, substantially as described.

OTTO B. FAHNEHJELM.
CARL DELLWIK.

Witnesses as to Fahnehjelm:
  NERE A. ELFWING,
  KNUT OLSEN.

Witnesses as to Dellwik:
  G. D. WILSON,
  P. N. WALDENSTRÖN.